(12) United States Patent
Li et al.

(10) Patent No.: US 11,152,609 B2
(45) Date of Patent: Oct. 19, 2021

(54) METHOD FOR SYNTHESIZING NICKEL-COBALT-ALUMINUM ELECTRODES

(71) Applicant: Tesla, Inc., Palo Alto, CA (US)

(72) Inventors: Hongyang Li, Halifax (CA); Jing Li, Mountain View, CA (US); Jeffery Raymond Dahn, Halifax (CA)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 16/265,128

(22) Filed: Feb. 1, 2019

(65) Prior Publication Data
US 2020/0127280 A1    Apr. 23, 2020

Related U.S. Application Data

(60) Provisional application No. 62/748,397, filed on Oct. 20, 2018.

(51) Int. Cl.
*H01M 4/1391* (2010.01)
*H01M 4/131* (2010.01)
*H01M 10/052* (2010.01)

(52) U.S. Cl.
CPC ......... *H01M 4/1391* (2013.01); *H01M 4/131* (2013.01); *H01M 10/052* (2013.01)

(58) Field of Classification Search
CPC ...... H01M 10/052; H01M 4/04; H01M 4/131; H01M 4/1391; H01M 4/525
See application file for complete search history.

(56) References Cited

U.S. PATENT DOCUMENTS

| | | | |
|---|---|---|---|
| 2007/0190419 A1* | 8/2007 | Takezawa | C01G 45/1228 429/231.1 |
| 2015/0037676 A1* | 2/2015 | Yamauchi | C01G 53/40 429/223 |
| 2018/0309124 A1* | 10/2018 | Kanada | C01G 53/42 |
| 2018/0351174 A1* | 12/2018 | Paulsen | H01M 4/505 |
| 2019/0020019 A1* | 1/2019 | Kim | H01M 4/463 |
| 2019/0074511 A1* | 3/2019 | Blangero | H01M 4/525 |
| 2019/0123347 A1* | 4/2019 | Kim | H01M 4/505 |
| 2020/0006762 A1* | 1/2020 | Park | C01G 53/50 |
| 2020/0020944 A1* | 1/2020 | Park | H01M 4/131 |

FOREIGN PATENT DOCUMENTS

| | | |
|---|---|---|
| CN | 107968193 | 4/2018 |
| WO | WO 17/042655 | 3/2017 |

OTHER PUBLICATIONS

G. Hu, W. Liu, Z. Peng, K. Du, Y. Cao.Synthesis and electrochemical properties of LiNi0.8Co0.15Al0.05O2 prepared from the precursor Ni0.8Co0.15Al0.05OOH, Journal of Power Sources 198 (2012) 258-263.*

Hongyang, Li., et al., "Synthesis of Single Crystal LiNi0.6Mn0.2Co0.2O2 with Enhanced Electrochemical Performance for Lithium Ion Batteries," Journal of the Electrochemical Society, vol. 165, pp. A1038-A1045 (2018).

Li, Jing, et al., "Synthesis of Single Crystal LiNi0.5Mn0.3Co0.2O2 for Lithium Ion Batteries," Journal of the Electrochemical Society, vol. 164, pp. A3529-A3537 (2017).

International Search Report and Written Opinion dated Dec. 17, 2019 in application No. PCT/US2019/057060.

* cited by examiner

*Primary Examiner* — Carlos Barcena (74) *Attorney, Agent, or Firm* — Knobbe, Martens, Olson & Bear, LLP (57) ABSTRACT

Compositions and methods of preparing energy storage device electrode active materials and electrodes are described. A two-step synthesis process may be utilized to prepare single crystal electrode active materials and electrodes, such as a single crystal nickel-cobalt-aluminum material. In some embodiments, the two step synthesis process includes a first and a second lithiation step.

19 Claims, 10 Drawing Sheets

METHOD FOR SYNTHESIZING NICKEL-COBALT-ALUMINUM ELECTRODES

CROSS-REFERENCE TO RELATED APPLICATION

This application claims priority to U.S. Patent Application No. 62/748,397 filed on Oct. 20, 2018 and all the benefits accruing therefrom under 35 U.S.C. § 119, the contents of which are incorporated by reference in their entirety.

TECHNICAL FIELD

The present disclosure relates to rechargeable battery systems, and more specifically to the methods of making nickel-cobalt-aluminum (NCA) electrodes for such systems. The present disclosure also relates to the fabrication of rechargeable battery cells, and more specifically, to the post-assembly formation, and testing process of rechargeable battery cells.

BACKGROUND

Rechargeable batteries are an integral component of energy-storage systems for electric vehicles and for grid storage (for example, for backup power during a power outage, as part of a microgrid, etc.). Many rechargeable battery systems rely on lithium compounds for one or both of the electrodes. In such systems, electrodes made from the lithium compounds are employed as an integral portion of the rechargeable battery system.

Standard methods of making electrodes for inclusion in rechargeable battery systems include a standard NCA (e.g. $LiNi_{1-x-y}Co_xAl_yO_2$ with x about 0.15 to 0.05 and y about 0.06 to 0.01) lithiation process and a standard single crystal NMC (e.g. $LiNi_{1-x-y}Mn_xCo_yO_2$ with x about 0.3 to 0.05 and y about 0.2 to 0.5) lithiation process. In the standard NCA lithiation process, $LiOH.H_2O$ materials are mixed with $NCA(OH)_2$ (the nomenclature $NCA(OH)_2$ refers to $Ni_{1-x-y}Co_xAl_y(OH)_2$) precursors with a designated Li/other metal (OM) ratio of 1.02. The 2% excessive $LiOH.H_2O$ is used to compensate lithium loss during high temperature calcination. In the single crystal NMC lithiation process, more than 2% excessive Li sources ($Li_2CO_3$ or $LiOH.H_2O$) are used (e.g. 10% for NMC622, and 20% for NMC532). See, e.g., Synthesis of Single Crystal LiNi0.6Mn0.2Co0.2O2 with Enhanced Electrochemical Performance for Lithium Ion Batteries; Li, Hongyang; Li, Jing; Ma, Xiaowei; et al. JOURNAL OF THE ELECTROCHEMICAL SOCIETY, Volume: 165, pages: A1038-A1045 (2018); Synthesis of Single Crystal $LiNi_{0.5}Mn_{0.3}Co_{0.2}O_2$ for Lithium Ion Batteries; Li, Jing; Li, Hongyang; Stone, Will; et al. JOURNAL OF THE ELECTROCHEMICAL SOCIETY, Volume: 164, pages: A3529-A3537 (2017). Additionally, higher heating temperature is typically needed, as well.

Further, heating NCA material to temperatures high enough for single crystal growth causes $Li_5AlO_4$ formation. And, including less Li reduces $Li_5AlO_4$ formation but this leads to materials with inferior electrochemical properties.

Definitions

"Cell" or "battery cell" generally refers to an electrochemical cell, which is a device capable of generating electrical energy from chemical reactions or facilitating chemical reactions through the introduction of electrical energy. A battery can contain one or more cells.

"Rechargeable battery" generally refers to a type of electrical battery which can be charged, discharged into a load, and recharged a number of times. In this disclosure, a number of examples are described based on Li-ion rechargeable batteries. Nevertheless, embodiments of the present invention are not limited to one type of rechargeable battery, and can be applied in conjunction with various rechargeable battery technologies.

SUMMARY

This disclosure includes methods of preparing electrode materials for use in rechargeable batteries. The present method allows for single crystal NCA materials to be produced without impurities which lead to "dead mass" in electrodes. A mixture of $NCA(OH)_2$ and $LiOH.H_2O$ is prepared with a Li:OM ratio less than 1.0. It should be noted that the Li:OM ratio is the ratio of the amount of lithium in the lithiated material to the amount of other metals in the lithiated material. This mixture is first heated to a temperature large enough to allow for single crystal growth. Because the Li:OM ratio is less than 1.0, the formation of $Li_5AlO_4$ is avoided. However, because the Li:OM ratio is less than 1.0, the product is $Li_{1-z}(Ni_{1-x-y}Co_xAl_y)_{1+z}O_2$ with z>0. Such materials have poor electrochemical properties unless z is very near zero. In a second heating a small amount of excess Li, q, is added so that: q>z The temperature of the second heating is chosen to be lower than that of the first heating so that the Li:OM ratio in the final product approaches 1.0 and that no $Li_5AlO_4$ is created. In such a way, impurity-free single crystal NCA can be created.

Methods disclosed herein include a first lithiation step, wherein a lithium and an other metal component are present in a first lithium/other metal ratio of less than 1.0 and are sintered at a temperature between 800 and 950° C. for a time period between 1 and 24 hours to obtain a first lithiated material. The method further includes a second lithiation step, wherein a lithium and a other metal component are present in a second lithium/other metal ratio and further wherein the first lithiated electrode material is sintered with additional $LiOH.H_2O$ at between 650 and 760° C. for a time period between 1 and 24 hours to obtain a second lithiated material.

In some embodiments, the first lithiated material comprises a product having the formula $Li_{(1-x)}[Ni_{0.88}Co_{0.09}Al_{0.03}]_{(1+x)}O_2$.

In further embodiments, the first lithium/other metal ratio is about 0.6, about 0.7, about 0.8, 0.9, about 0.95, or about 0.975.

In yet other embodiments, during the second lithiation step, the first lithiated product is sintered for approximately 12 hours.

In some embodiments, the sum of the first lithium/other metal ratio and the second lithium/other metal ratio is between 1.0 and 1.03.

In further embodiments, the other metal component includes: Al, Ni, Co, Mn, Mg, or a combination of them. In other embodiments, the other metal component includes Ni, Co, and Al. In further embodiments, the other metal component includes Ni and Al.

According to certain embodiments provided herein, the present disclosure also provides an electrode formed using the methods described herein, and rechargeable batteries including the electrodes that are formed using the methods described herein.

BRIEF DESCRIPTION OF THE DRAWINGS

FIG. 2b is the result of a first lithiation reaction at 900° C. with a Li/OM ratio of 0.95; FIG. 2c is the result of a first lithiation reaction at 875° C. with a Li/OM ratio of 0.95; FIG. 2d is the result of a first lithiation reaction at 850° C. with a Li/OM ratio of 0.975; FIG. 2e is the result of a first lithiation reaction at 950° C. with a Li/OM ratio of 0.90; FIG. 2f is the result of a first lithiation reaction at 900° C. with a Li/OM ratio of 0.925; FIG. 2g is the result of a first lithiation reaction at 875° C. with a Li/OM ratio of 0.925; FIG. 2h is the result of a first lithiation reaction at 850° C. with a Li/OM ratio of 0.95; FIG. 2i is the result of a first lithiation reaction at 950° C. with a Li/OM ratio of 0.80; FIG. 2j is the result of a first lithiation reaction at 900° C. with a Li/OM ratio of 0.90; FIG. 2k is the result of a first lithiation reaction at 875° C. with a Li/OM ratio of 0.90; and FIG. 2l is the result of a first lithiation reaction at 850° C. with a Li/OM ratio of 0.90.

FIGS. 3a to 3l show SEM images of four series of two-step lithiation products with a 5 μm scale bar indicated. FIGS. 3(a), 3(b), 3(c), and 3(d) show the four selected post first lithiation products whose products of the second lithiation reaction of FIG. 2i are shown with Li/OM ratio of 1.01 (see FIG. 3e) and 1.02 (see FIG. 3i); products of the second lithiation reaction FIG. 2j are shown with a Li/OM ratio of 1.01 (see FIG. 3f) and 1.02 (see FIG. 3j); products of the second lithiation reaction of FIG. 2c) are shown with a Li/OM ratio of 1.01 (see FIG. 3g) and 1.02 (see FIG. 3k); and products of the second lithiation reaction of FIG. 2d are shown with a Li/OM ratio of 1.01 (see FIG. 3h) and 1.02 (see FIG. 3l).

FIGS. 4A to 4L show an expanded view of the portion of the diffraction pattern where peaks from impurity phases like Li$_2$CO$_3$ and Li$_5$AlO$_4$ appear. It is desired to have no visible impurity peaks, well split 108/110 peaks and a 104 peak near 44.4° as in FIGS. 4k and 4K. These comments apply to the particular NCA880903 composition studied here.

FIGS. 6a to 6f show portions of the x-ray diffraction patterns of PC880903 and SC880903. PC880903 is a polycrystalline sample of NCA880903, while SC880903 is a single crystal sample of NCA880903 made with first lithiation at 875° C. with a Li/OM ratio of 0.95, and subsequent second lithiation at 735° C. with a final Li/OM ratio of 1.01. Notice that the diffraction peaks for SC880903 are much sharper than those of PC880903, consistent with larger crystallite grains expected from a single crystal sample.

FIGS. 9a to 9b illustrate that the capacity retention for the single crystal sample is at least as good as the polycrystalline sample when 2% VC is used.

FIG. 10e illustrates experimental data showing the relative intensity plotted as a function of sintering temperature and Li/OM ratio for 4 different first lithiation products.

DETAILED DESCRIPTION OF THE DISCLOSURE

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

New studies by the inventors have identified a two-step synthesis process for preparing single crystal nickel-cobalt-aluminum electrodes. In certain embodiments, the two step synthesis process includes two lithiation steps. In the first lithiation step, in order to avoid forming Li$_5$AlO$_4$ at high sintering temperature, precursors with Li/OM molar ratios of less than 1.0 (e.g. Li/OM=0.6, 0.8, 0.9, 0.95) are lithiated at higher sintering temperature, such as 800° C. to 950° C. This sintering step might take between 1 hour to 24 hours depending on the temperature selected, the furnace configuration used and the final crystallite size desired. In the first lithiation step, $Li_{(1-x)}[Ni_{0.88}Co_{0.09}Al_{0.03}]_{(1+x)}O_2$ is obtained. In the second lithiation step, in order to compensate for the lithium deficiency, the material is sintered with more $LiOH.H_2O$ at standard NCA lithiation temperature (approximately 650 to 760° C.) for approximately 12 hours. This sintering step might take between 1 hour to 24 hours depending on the temperature selected and the furnace configuration used. The amount of added $LiOH.H_2O$ in the second lithiation step is determined by overall target of the Li/OM molar ratio in the final product. In some embodiments, in the first lithiation step if a Li/OM molar ratio of "b" is selected, then in the second lithiation step a further additional Li/OM molar ratio of "1.0-b," "1.01-b", "1.02-b", 1.03-b", etc. is selected depending on the amount of lithium loss anticipated in both the first and second lithiation steps. In other words, the sum of the Li/OM molar ratio in the first lithiation step and the Li/OM molar ratio in the second lithiation step is 1.0, 1.01, 1.02, or 1.03. In some embodiments, the goal is to make a final product with a Li/OM molar ratio very near 1.00 and with very little Ni atoms in the Li layer of the material (less than 2%).

Certain of these new battery systems may be used in energy-storage applications and also automobile application (including energy storage within an electric vehicle) in which charge and discharge speeds, and lifetime when charging and discharging quickly are important.

Experiments

Lithiation Experiments

Figure 1A:
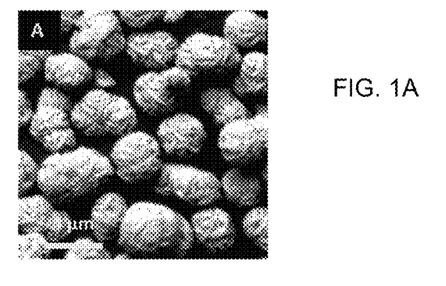
FIG. 1A shows Scanning Electron Microscopy (SEM) images of the NCA(OH)$_2$ precursor with a 4 μm scale bar shown and FIG. 1B shows SEM images of the resulting NCA(OH)$_2$ product with a 10 μm scale bar shown.
Figure 1B:
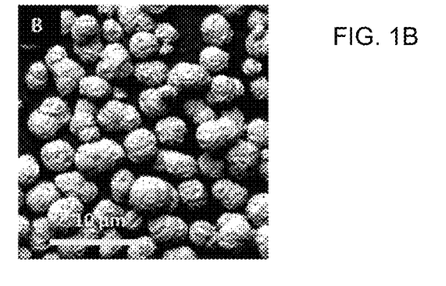

NCA880903 precursor hydroxides were obtained from Guizhou Zoomwe Zhengyuan Advanced Material Co., Ltd. The NCA880903 precursor was analyzed using a Phenom G2-pro desktop scanning electron microscope. FIG. 1A shows SEM images of the resulting $NCA(OH)_2$ product with a 4 μm scale bar shown and FIG. 1B shows SEM images of the resulting $NCA(OH)_2$ product with a 10 μm scale bar shown.

Figure 2A:
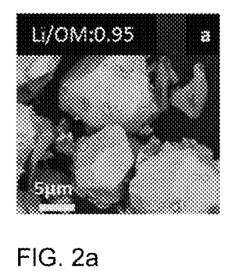
FIGS. 2a-2l show SEM images of the resulting product from a variety of first lithiation reactions with a 5 μm scale bar indicated. Shown in FIG. 2a is the result of a first lithiation reaction between NCA(OH)$_2$ and LiOH.H$_2$O at 950° C. with a Li/OM ratio of 0.95.
Figure 2B:
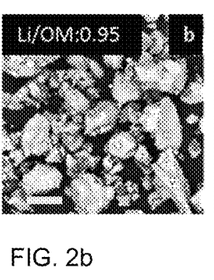
Figure 2C:
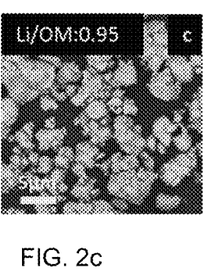
Figure 2D:
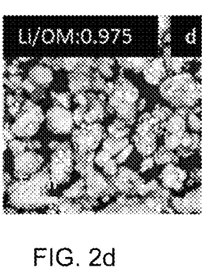
Figure 2E:
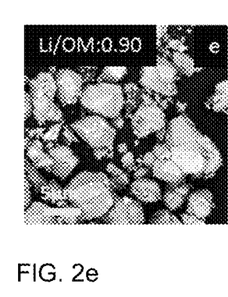
Figure 2F:
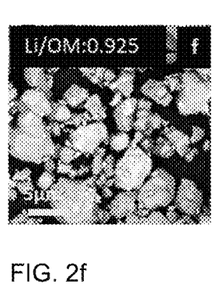
Figure 2G:
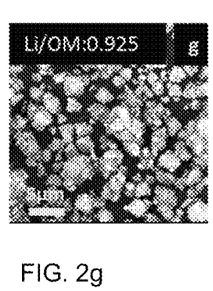
Figure 2H:
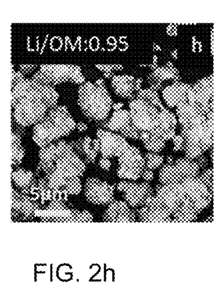
Figure 2I:
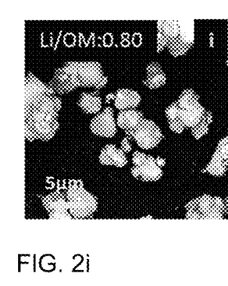
Figure 2J:
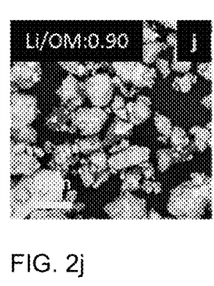
Figure 2K:
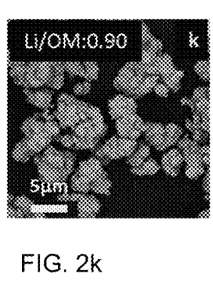
Figure 2L:
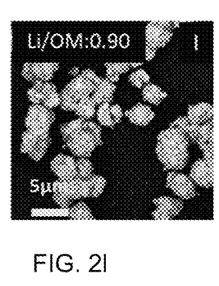
Figure 3A:
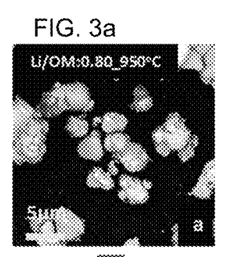
Figure 3B:
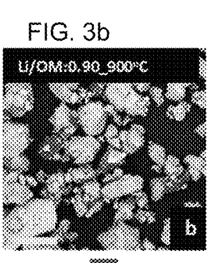
Figure 3C:
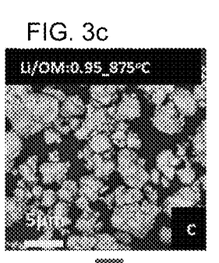
Figure 3D:
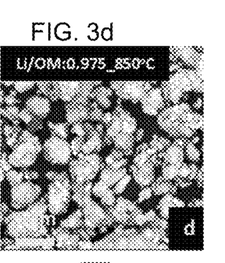
Figure 3E:
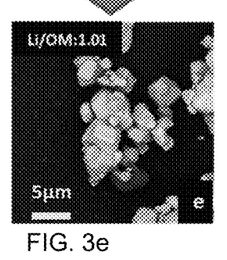
Figure 3F:
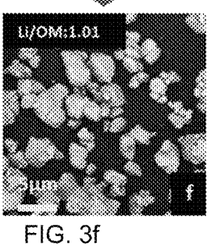
Figure 3G:
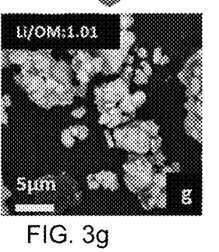
Figure 3H:
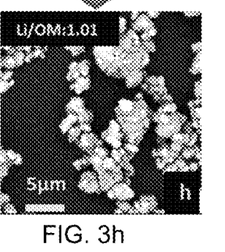
Figure 3I:
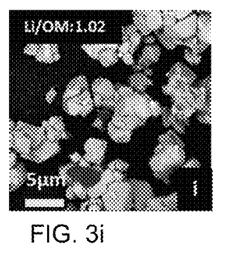
Figure 3J:
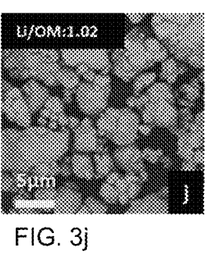
Figure 3K:
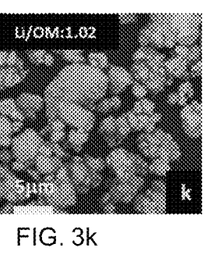
Figure 3L:
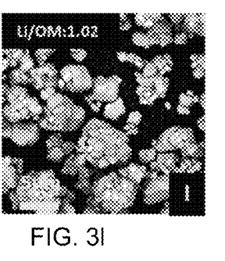
Figure 4A:
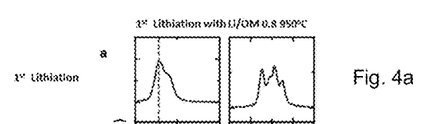
FIGS. 4a to 4l and 4A to 4L show partial x-ray diffraction patterns for the each of the samples depicted in FIGS. 3a to 3l. The X-ray data in FIGS. 4a and 4A correspond to the sample shown in FIG. 3a, and so forth. When the sample is incompletely lithiated, an X-ray diffraction peak appears near 44.25°. When the sample is completely lithiated, this 104 peak appears near 44.40°. This behavior for the samples is shown in FIGS. 4a to 4l. In addition, the 108/110 diffraction peaks appear as clearly split pair of Kα$_1$ and Kα$_2$ peaks in fully lithiated samples (see FIGS. 4h and 4l).
Figure 4B:
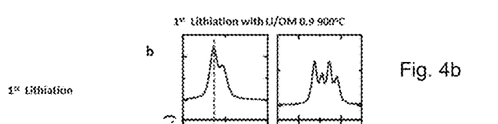
Figures 4B, 4F:
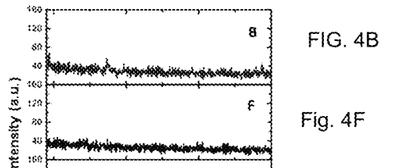
Figure 4C:
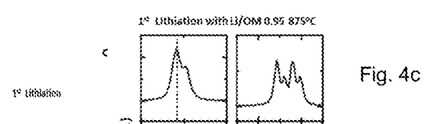
Figure 4D:
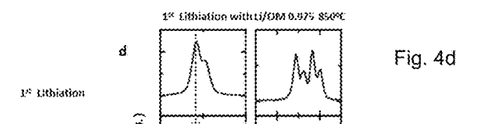
Figure 4E:
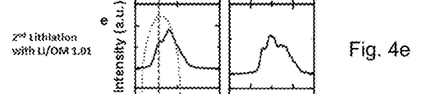
Figures 4E, 4I:
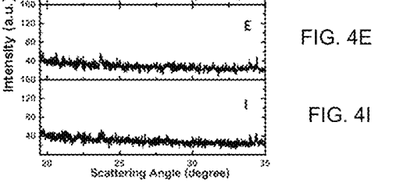
Figure 4F:
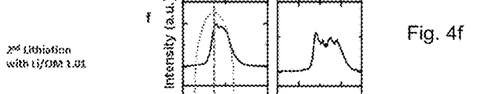
Figure 4G:
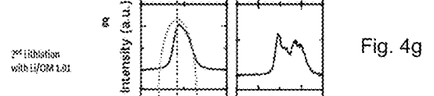
Figure 4H:
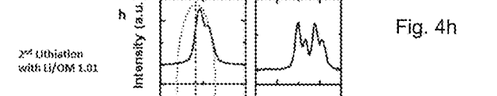
Figure 4I:
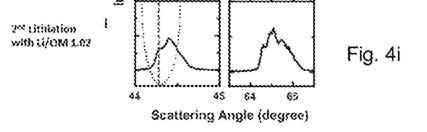
Figure 4J:
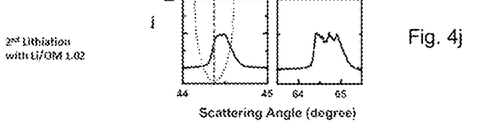
Figure 4K:
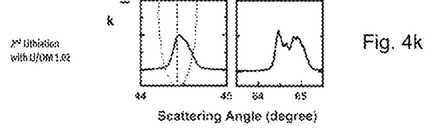
Figure 4L:
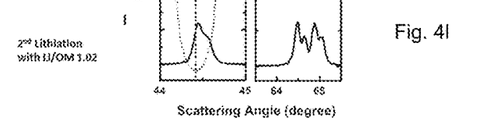

Lithiation experiments were then conducted at a number of temperatures and with a variety of Li/OM ratios. FIG. 2 shows SEM images, taken with a Phenom G2-Pro desktop SEM, of the resulting product from these first lithiation reactions shown with 5 μm scale bars. Shown in FIG. 2a is the result of a first lithiation reaction at 950° C. with a Li/OM ratio of 0.95; FIG. 2b is the result of a first lithiation reaction at 900° C. with a Li/OM ratio of 0.95; FIG. 2c is the result of a first lithiation reaction at 875° C. with a Li/OM ratio of 0.95; FIG. 2d is the result of a first lithiation reaction at 850° C. with a Li/OM ratio of 0.975; FIG. 2e is the result of a first lithiation reaction at 950° C. with a Li/OM ratio of 0.90; FIG. 2f is the result of a first lithiation reaction at 900° C. with a Li/OM ratio of 0.925; FIG. 2g is the result of a first lithiation reaction at 875° C. with a Li/OM ratio of 0.925; FIG. 2h is the result of a first lithiation reaction at 850° C. with a Li/OM ratio of 0.95; FIG. 2i is the result of a first lithiation reaction at 950° C. with a Li/OM ratio of 0.80; FIG. 2j is the result of a first lithiation reaction at 900° C. with a Li/OM ratio of 0.90; FIG. 2k is the result of a first lithiation reaction at 875° C. with a Li/OM ratio of 0.90; and FIG. 2l is the result of a first lithiation reaction at 850° C. with a Li/OM ratio of 0.90. In all cases the samples were heated for 12 hours under a flow of $O_2$ gas in a tube furnace equipped with an alumina tube to carry the $O_2$ gas.

From the first lithiation experiments, certain products were selected for additional assessments: the result of a first lithiation reaction at 950° C. with a Li/OM ratio of 0.80; the result of a first lithiation reaction at 900° C. with a Li/OM ratio of 0.90; the result of a first lithiation reaction at 875° C. with a Li/OM ratio of 0.95; and the result of a first lithiation reaction at 850° C. with a Li/OM ratio of 0.975. These samples were selected due to their favorable particle sizes, the relatively small amount of impurity phases detected by X-ray diffraction (see FIGS. 4A-L) and the small amount of further lithium required to be added during the second lithiation. These four products were then subjected to a second lithiation at 735° C. for approximately 12 hours under $O_2$ flow, at varying Li/OM ratios. SEM Images in FIGS. 3a to 3l show the products of the second lithiation reaction of FIG. 2i with Li/OM ratio of 1.01 and 1.02; second lithiation reaction of FIG. 2j with a Li/OM ratio of 1.01 and 1.02; second lithiation reaction of FIG. 2c with a Li/OM ratio of 1.01 and 1.02; and second lithiation reaction of FIG. 2d with a Li/OM ratio of 1.01 and 1.02. The products for the second lithiation reactions were further analyzed using X-ray diffraction where the x-ray diffraction intensity is plotted versus the scattering angle. Only portions of the diffraction patterns are shown. The X-ray data in FIG. 4a and FIG. 4A corresponds to the sample shown in FIG. 3a, and so forth. When the sample is incompletely lithiated, an X-ray diffraction peak appears near 44.25°. When the sample is completely lithiated, this 104 peak appears near 44.40°. This behavior for the samples is shown in FIGS. 4a to 4l. In addition, the 108/110 diffraction peaks appear as clearly split pair of $K\alpha_1$ and $K\alpha_2$ peaks in fully lithiated samples (see FIGS. 4h and 4l). FIGS. 4A to 4L show an expanded view of the portion of the diffraction pattern where peaks from impurity phases like $Li_2CO_3$ and $Li_5AlO_4$ appear. It is desired to have no visible impurity peaks, well split 108/110 peaks and a 104 peak near 44.4° as in FIGS. 4k and 4K. These comments apply to the particular NCA880903 composition studied here.

Figure 5:
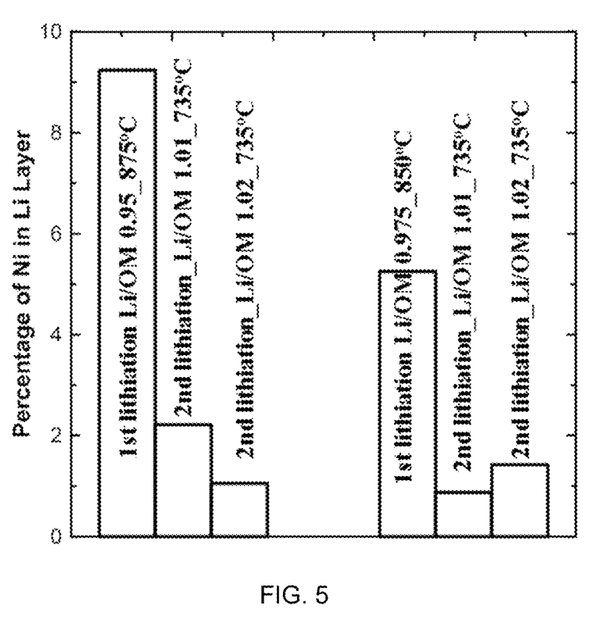
FIG. 5 illustrates the percentage of nickel in the lithium layer (determined by x-ray profile refinement using the Rietveld method) after the second lithiation reactions for the first lithiation reaction at 875° C. with a Li/OM ratio of 0.95, and subsequent second lithiation reactions, and the result of a first lithiation reaction at 850° C. with a Li/OM ratio of 0.975 and subsequent second lithiation reactions. It is desired to have the percentage of Ni in the lithium layer as small as possible.
Figure 6A:
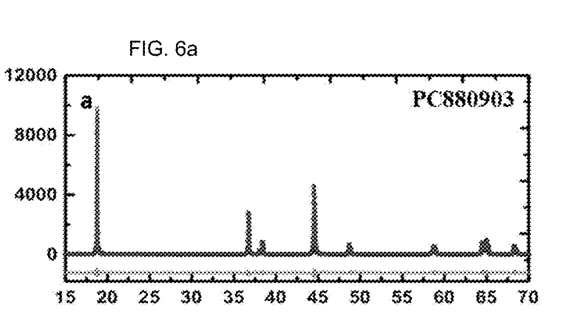
Figure 6B:
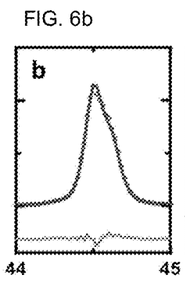
Figure 6C:
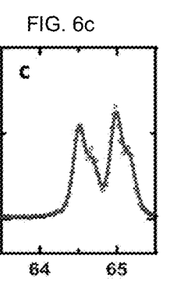
Figure 6D:
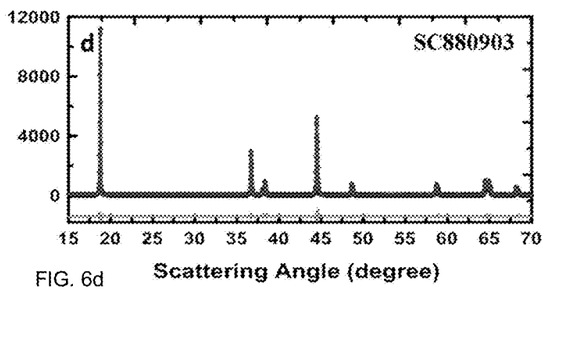
Figure 6E:
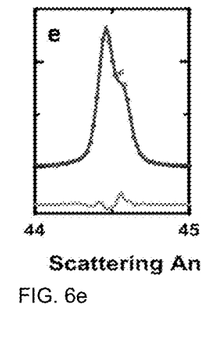
Figure 6F:
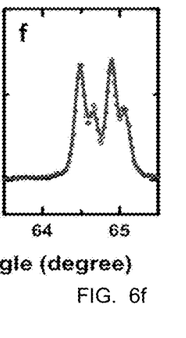

Additionally, for two of the products of the second lithiation reactions, additional assessments were made of the percentage of nickel in the lithium layer using Rietveld X-ray profile analysis. Nickel atoms in the lithium layer are undesired as they occupy lithium sites (reducing specific capacity) and hinder the rapid diffusion of lithium within the lithium layer (reducing Li-ion battery rate capability). FIG. 5 illustrates the percentage of nickel atoms in the lithium layer after the second lithiation reactions for the first lithiation reaction at 875° C. with a Li/OM ratio of 0.95, and subsequent second lithiation reactions, and the result of a first lithiation reaction at 850° C. with a Li/OM ratio of 0.975 and subsequent second lithiation reactions.

The single crystal NCA product made with a first lithiation temperature of 850° C. and a Li/OM ratio of 0.975 followed by a second lithiation temperature of 735° C. and an overall Li/OM ratio of 1.01 is called SC880903 or SC-NCA880903. This sample is compared to a conventional NCA sample which has polycrystalline grains, called PC880903. The PC880903 sample was made in a single heating at 735° C. with a Li/OM ratio of 1.02. Table 1 shows the structural information for the two samples extracted from the x-ray diffraction data in FIGS. 6a to 6f. Table 1 shows that the a and c lattice parameters (given in Angstroms) of the two samples are very similar indicating that the two-step heating procedure does create materials with equivalent structure to the materials made in a single heating step. Only the particle morphology differs. Table 1 also shows that both samples have less than 1% of Ni atoms in the Li layer. The Bragg agreement factor, $R_b$, is less than 2.5% for both samples and indicates that the quality of the x-ray profile refinements, from which the structural parameters were extracted, is excellent.

TABLE 1

| | 1st Lith. Condition | 2nd Lith. Condition | Overall Li:OM | Sint. Time | a | c | Ni/Li Mixing | Rb factor |
|---|---|---|---|---|---|---|---|---|
| PC880903 | Li/OM 1.02_735° C. | N/A | 1.02 | 12 h | 2.869 | 14.194 | 0.6 | 1.86 |
| SC880903 | Li/OM 0.975_850° C. | 735° C. | 1.01 | 12 h | 2.8718 | 14.189 | 0.875 | 2.13 |

Cycling Experiments

To study the effectiveness of the battery systems made using materials of certain embodiments of the present disclosure, charge-discharge cycling experiments were performed.

Figure 7:
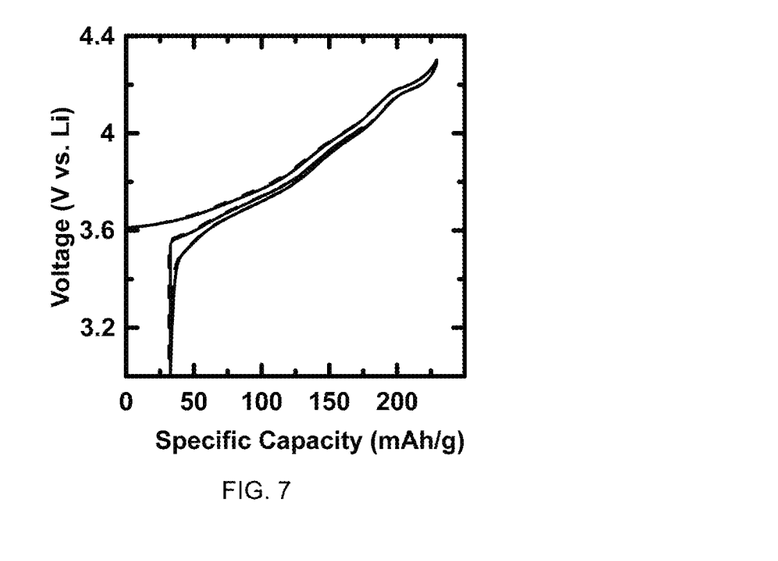
FIG. 7 illustrates typical experimental data studying charge-discharge cycling in a half coin cell at C/20 showing the voltage versus specific capacity of SC-NCA880903. The electrolyte used was 1M LiPF$_6$ in EC:DEC (1:2). The testing was made at 30° C. between voltage limits of 3.0V and 4.3V.

FIG. 7 illustrates typical experimental data studying charge-discharge cycling in a half coin cell at C/20 showing the voltage versus specific capacity of SC-NCA880903. The electrolyte used was 1M LiPF$_6$ in EC:DEC (1:2). The testing was made at 30° C. between voltage limits of 3.0V and 4.3V. Those skilled in the art will recognize a typical voltage specific capacity profile for NCA880903.

Figure 8:
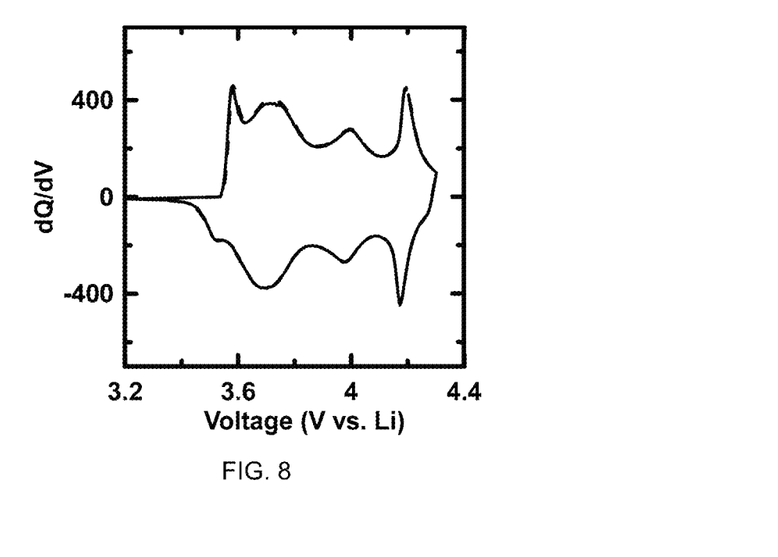
FIG. 8 illustrates typical experimental data collected in a half coin cell at C/20 showing dQ/dV vs. V for SC-NCA880903. The electrolyte used was 1M LiPF$_6$ in EC:DEC (1:2). The testing was made at 30° C. between voltage limits of 3.0V and 4.3V.

FIG. 8 illustrates typical experimental data collected in a half coin cell at C/20 showing dQ/dV vs. V for SC-NCA880903. The electrolyte used was 1M LiPF$_6$ in EC:DEC (1:2). The testing was made at 30° C. between voltage limits of 3.0V and 4.3V. Those skilled in the art will recognize a typical dQ/dV vs. V profile for NCA880903.

Figure 9A:
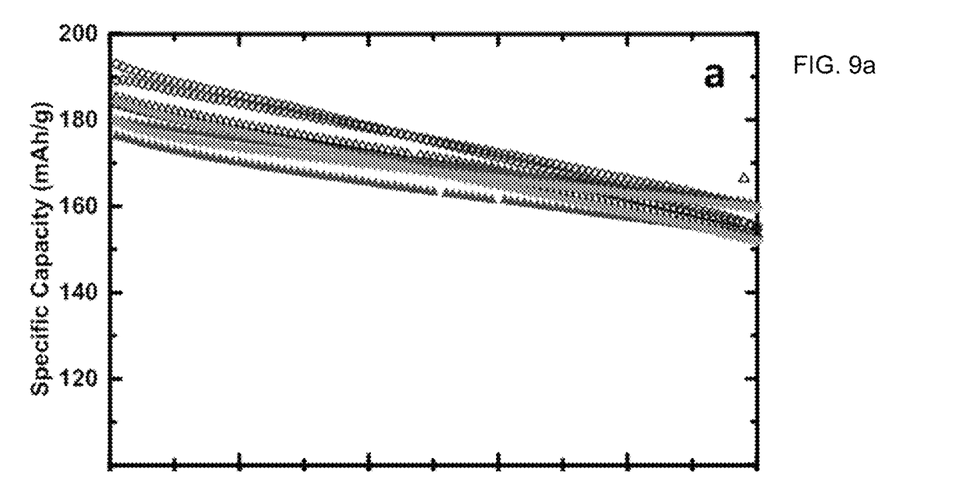
FIGS. 9a to 9b illustrate experimental data collected during charge-discharge cycling experiments in full coin cell at C/5 including specific capacity and normalized discharge capacity for SC-NCA880903 and PC-NCA880903 samples. The electrolyte used was either 1M LiPF$_6$ in EC:DEC (1:2) with 2% VC or 1M LiPF$_6$ in EC:DEC (1:2) without VC, called "control" here. The testing was made at 30° C. between voltage limits of 3.0V and 4.2V. The PC-NCA880903 is a typical polycrystalline NCA sample.
Figure 9B:
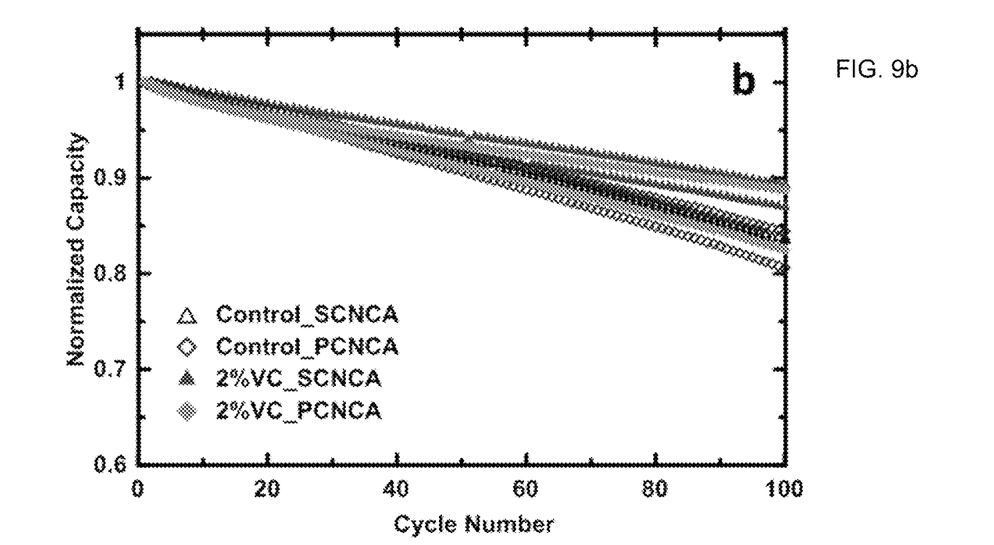
Figure 10A:
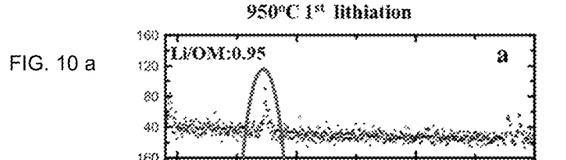
FIGS. 10a to 10e illustrate experimental data showing the impurity Bragg diffraction peak relative intensity plotted as a function of sintering temperature and Li/OM ratio for 4 different first lithiation products (as shown in FIGS. 10a, 10b, 10c, and 10d).
Figure 10B:
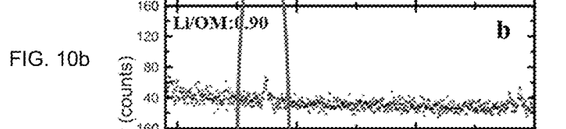
Figure 10C:
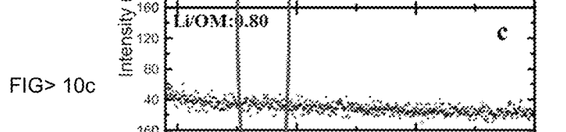
Figure 10D:
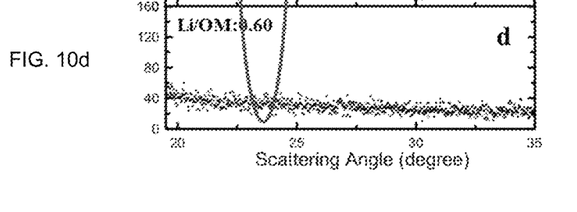
Figure 10E:
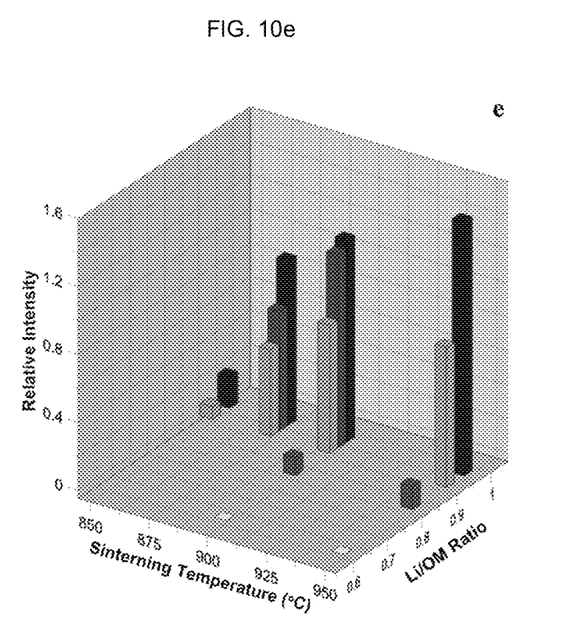

FIGS. 9a and 9b illustrate experimental data collected during charge-discharge cycling experiments in full coin cell at C/5 including specific capacity and normalized discharge capacity for SC-NCA880903 and PC-NCA880903 samples. The electrolyte used was either 1M LiPF$_6$ in EC:DEC (1:2) with 2% VC or 1M LiPF$_6$ in EC:DEC (1:2) without VC, called "control" here. The testing was made at 30° C. between voltage limits of 3.0V and 4.2V. The PC-NCA880903 is a typical polycrystalline NCA sample. FIGS. 9a and 9b illustrate that the capacity retention for the single crystal sample is at least as good as the polycrystalline sample when 2% VC is used. FIGS. 10a to 10d illustrate experimental data showing the most intense Li$_5$AlO$_4$ impurity Bragg diffraction peak relative intensity plotted as a function of sintering temperature and Li/OM ratio for 4 different first lithiation products (as shown in FIGS. 10a, 10b, 10c, and 10d). FIG. 10e illustrates experimental data showing the relative intensity plotted as a function of sintering temperature and Li/OM ratio for 4 different first lithiation products. The results in FIGS. 2 and 10 can be used to select the first lithiation conditions appropriately. One desires a small amount of impurity and appropriately sized particles.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims. Reference to additives in the specification are generally to operative additives unless otherwise noted in the specification.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Reference to "about" or "approximately" is to be construed to mean plus or minus 10%.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A method of preparing an electrode comprising:
   a first lithiation step, wherein a first lithium component and an other metal component are present in a first lithium/other metal molar ratio of less than 1.0 and are sintered at a temperature between 800 and 950° C. for a time period between 1 and 24 hours to obtain a first lithiated material;

a second lithiation step, wherein the first lithiated material is sintered with an additional lithium component at between 650° C. and 760° C. for a time period between 1 and 24 hours to obtain a second lithiated material with a total lithium/other metal molar ratio; and forming a lithium transition metal oxide electrode from the second lithiated material;

wherein the second lithiated material comprises a substantially impurity-free single crystal lithiated material.

2. The method of claim 1, wherein the first lithiated material comprises a product having the formula $Li_{(i-x)}[Ni_{0.88}Co_{0.09}Al_{0.03}]_{(1+x)}O_2$.

3. The method of claim 1, wherein the first lithium/other metal molar ratio is about 0.6.

4. The method of claim 1, wherein the first lithium/other metal molar ratio is about 0.7.

5. The method of claim 1, wherein the first lithium/other metal molar ratio is about 0.8.

6. The method of claim 1, wherein the first lithium/other metal molar ratio is about 0.9.

7. The method of claim 1, wherein the first lithium/other metal molar ratio is about 0.95.

8. The method of claim 1, wherein the first lithium/other metal molar ratio is about 0.975.

9. The method of claim 1, wherein during the second lithiation step is performed for approximately 12 hours.

10. The method of claim 1, wherein the total lithium/other metal molar ratio is between 1.0 and 1.03.

11. The method of claim 1, wherein the other metal component comprises an element selected from the group consisting of Ni, Co, Al, Mn, Mg, and combinations thereof.

12. The method of claim 1, wherein the other metal component comprises Ni, Co, and Al.

13. The method of claim 1, wherein the other metal component comprises Ni and Al.

14. The method of claim 1, further comprising forming a rechargeable battery from the lithium electrode.

15. The method of claim 1, wherein first lithium component is $LiOH.H_2O$.

16. The method of claim 1, wherein the additional lithium component is $LiOH.H_2O$.

17. The method of claim 1, wherein the other metal component comprises a lithium nickel cobalt aluminum oxide (NCA) precursor, a lithium nickel manganese cobalt oxide (NMC) precursor, or a combination thereof.

18. The method of claim 17, wherein the other metal component is $NCA(OH)_2$ having the formula $Ni_{1-x-y}Co_xAl_y(OH)_2$.

19. The method of claim 1, wherein the first lithium/other metal molar ratio is about 0.6-0.975.

* * * * *